US010444991B1

(12) United States Patent
Lu et al.

(10) Patent No.: US 10,444,991 B1
(45) Date of Patent: Oct. 15, 2019

(54) IN-PLACE RESUMABLE PARTIAL DECOMPRESSION

(71) Applicant: EMC Corporation, Hopkinton, MA (US)

(72) Inventors: Guanlin Lu, San Jose, CA (US); Mahesh Kamat, San Jose, CA (US); Sudhanshu Goswami, Santa Clara, CA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 121 days.

(21) Appl. No.: 14/964,498

(22) Filed: Dec. 9, 2015

(51) Int. Cl.
*G06F 3/06* (2006.01)
*G06F 12/02* (2006.01)

(52) U.S. Cl.
CPC ............ *G06F 3/0604* (2013.01); *G06F 3/065* (2013.01); *G06F 3/0631* (2013.01); *G06F 3/0683* (2013.01); *G06F 12/023* (2013.01); *G06F 2212/401* (2013.01)

(58) Field of Classification Search
CPC ...... G06F 3/0604; G06F 3/0631; G06F 3/065; G06F 3/0683; G06F 2211/1014; G06F 2212/401; G06F 12/023
See application file for complete search history.

(56) References Cited

U.S. PATENT DOCUMENTS

| | | | | |
|---|---|---|---|---|
| 5,901,277 A | * | 5/1999 | Chu | G06T 9/00 358/1.15 |
| 6,879,266 B1 | * | 4/2005 | Dye | G06F 12/08 341/51 |
| 7,849,241 B2 | * | 12/2010 | Gschwind | G06F 12/04 709/201 |
| 9,400,754 B2 | * | 7/2016 | Hopper | G06F 12/121 |
| 9,495,288 B2 | * | 11/2016 | Cohen | G11C 16/08 |
| 2010/0161567 A1 | * | 6/2010 | Makela | G06F 17/30312 707/693 |
| 2012/0210091 A1 | * | 8/2012 | Devendra | G06F 12/1009 711/170 |
| 2014/0006745 A1 | * | 1/2014 | Fontenot | G06F 12/04 711/170 |
| 2014/0184601 A1 | * | 7/2014 | Dunaisky | G09G 5/393 345/424 |
| 2014/0208003 A1 | * | 7/2014 | Cohen | G06F 12/0246 711/103 |
| 2015/0066878 A1 | * | 3/2015 | Agarwal | H03M 7/3086 707/693 |
| 2015/0089096 A1 | * | 3/2015 | Stark | G06F 3/0683 710/54 |
| 2015/0089170 A1 | * | 3/2015 | Tung | G06F 12/023 711/160 |
| 2015/0149739 A1 | * | 5/2015 | Seo | G06F 3/0608 711/162 |

* cited by examiner

*Primary Examiner* — Arpan P. Savla
(74) *Attorney, Agent, or Firm* — Barry N. Young

(57) ABSTRACT

Processing and memory resources are optimized in a data storage system by reading a region of compressed data containing desired data is read from primary storage, writing the compressed data to a memory page, selectively decompressing the compressed data to retrieve the desired data, and the writing the decompressed data back to the same page. State information about the start of the compressed data and the end of the decompressed data on the page is maintained to enable decompression to be halted and resumed on demand.

12 Claims, 4 Drawing Sheets

Allocate a new page to host the remaining compressed data

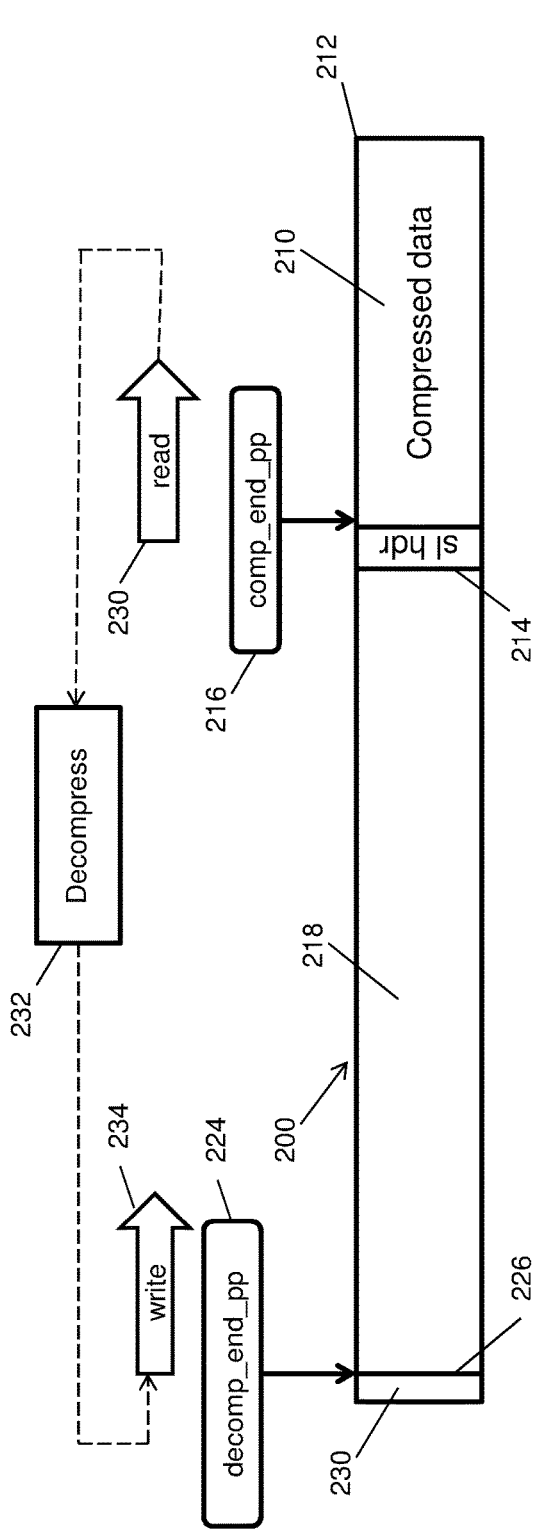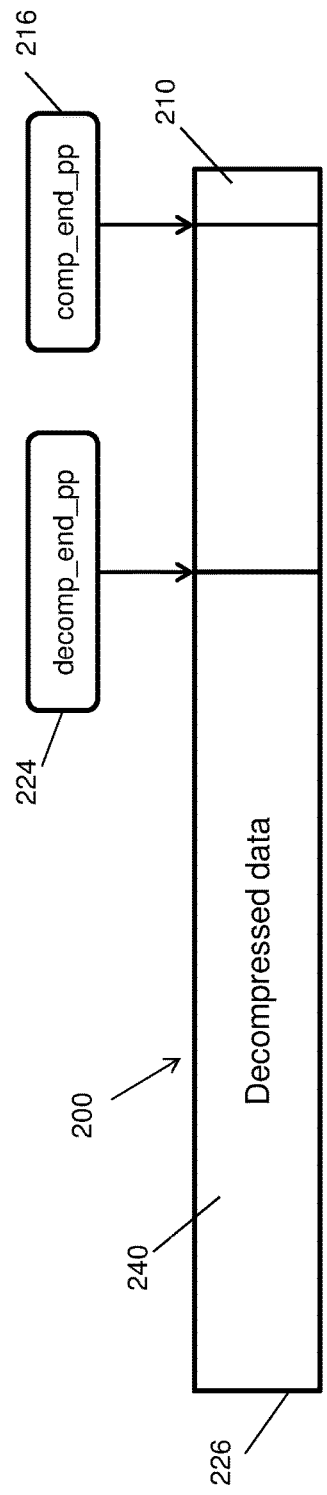
Figure 2A
Figure 2B

IN-PLACE RESUMABLE PARTIAL DECOMPRESSION

BACKGROUND

This invention relates generally to data storage systems and methods that rely upon data compression techniques to reduce the amount of physical storage required to store user data, and more particularly to systems and methods that minimize and optimize system processing for retrieving data.

Storage systems have widely relied on data compression techniques to reduce the data footprint so that the same amount of physical storage space can host more user data. Compression is a common technique to reduce physical data storage requirements. At a high level, standard data compressors work on uncompressed data of original length X and output compressed data of a smaller length Y. The difference X−Y is the physical storage space saved by data compression. To get back the original data, standard decompressors decompress every byte in the compressed data of length Y and output the original data of length X. However, in many cases only a fraction of compressed data is actually needed, and decompressing all of the data wastes CPU processing cycles on uncompressing unwanted data. Both data compression and decompression are CPU intensive tasks. Decompressing unneeded data is inefficient and wastes processing resources, and in large storage systems where there are numerous concurrent read requests, this slows data access. In addition, existing decompressors often need two separate buffers, one for the input of compressed data and one for the output of decompressed data. This requires allocating excess memory resources for decompression that are otherwise unneeded, and causes inefficient memory utilization.

Another example where processing and memory inefficiencies exist in decompressing data is in common deduplication storage systems, as used for backup, for example, where duplicate copies of data are eliminated and backup data is packed and compressed into regions and placed on disks. When retrieving a high-generation (high-gen) data backup, data from regions that were produced by low generation data backups are needed because high-gen data backups are de-duplicated against low-gen data backups. Again, often only a fraction of low-gen data is typically required to retrieve the needed high-gen data backup.

Garbage collection processes are used to reclaim storage space by eliminating dead (unneeded) chunks of data will move and reorder data, and are another example where there are processing and memory inefficiencies. Typically, garbage collection only needs to copy forward live data chunks interspersed among dead chunks. Although live and dead data chunks are compressed together, garbage collection is only interested in the live chunks so that decompression of dead chunks is unnecessary. However, decompression processes must usually decompress all data chunks, alive and dead, then copy live chunks to a new location and discard the dead chunks.

It is desirable to provide data decompression systems and processes that avoid the foregoing and other problems associated with processing compressed data by avoiding wasteful CPU processing cycles and inefficient memory usage to reduce CPU processing burden and improve data access. It is particularly desirable to provide systems and processes that enable decompression of a specified range or portion of data in a region of compressed data to avoid wasting processing cycles decompressing unwanted data. It is to these ends that the present invention is directed.

BRIEF DESCRIPTION OF THE DRAWINGS

FIGS. 2A and 2B are diagrammatic views illustrating in-place resumable partial decompression in accordance with the invention, FIG. 2B illustrating a case where the end position of the decompressed data and output page is less than the beginning position of compressed data;

DESCRIPTION OF PREFERRED EMBODIMENTS

The invention is particularly applicable to data storage systems that de-duplicate and compress data as for data storage or backup, and will be described in that context. As will become apparent, however, this is illustrative of only one utility of the invention and that the invention has wider applicability and may be used with other types of data compression and storage systems.

Figure 1:
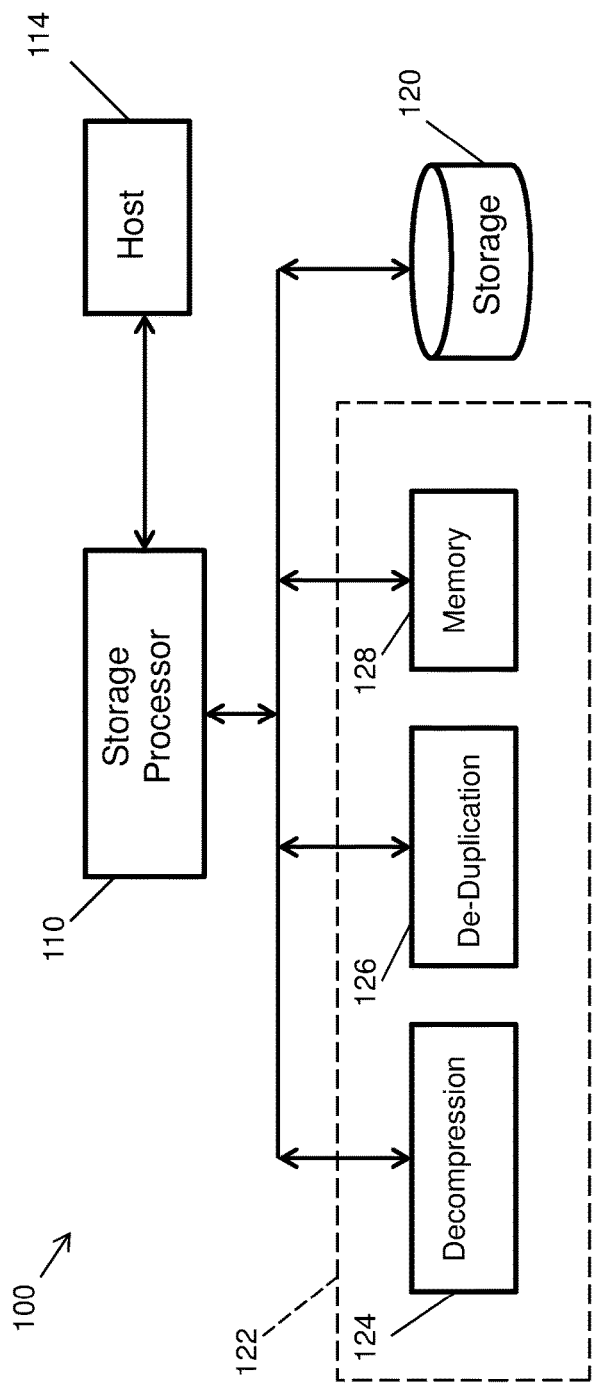
FIG. 1 is a functional block diagram of a data storage system in which the invention may be used.

FIG. 1 illustrates functionally an embodiment of a data storage system 100 for the storage and retrieval of de-duplicated and compressed data in which the invention may be employed. System 100 may be in a datacenter, for instance, of an enterprise or other organization. As shown, the system may comprise a storage processor 110 that receives production data and data requests from a host 114, and manages storage and retrieval of the data to and from data storage 120 comprising one or more disks. The system may additionally comprise physical memory 122 for storing software application programs as executable instructions, as for data compression and decompression 124 and for data de-duplication 126, and memory 128 that is used for storing metadata and applications for managing data storage operations and for various other processing operations. Memory 128 may also comprise, for example, a memory page pool from which memory pages may be allocated for use as buffers during decompressing of compressed data, as will be described. In a preferred embodiment, pages may be 128 KB (kilobytes) in length comprising sixteen 8 KB data segments or chunks. Original data prior to compression and storage to disk storage is preferably stored in memory in 128 KB pages. After compression, the compressed data stored on disk will be smaller than 128 KB.

Upon receiving incoming data, the system 100 will compress the incoming data, de-duplicate the data, and store the compressed data to disk storage 120. Additionally, the system may create and store in memory 128 metadata that provides information on the tree structure and locations where particular data is stored on disk and where it is located within particular regions. In an embodiment, system 100 may comprise a Data Domain data de-duplication backup and storage system of EMC Corporation, the assignee of the present invention.

As will be described in more detail below, the invention affords a system and method which optimize data storage and retrieval in a storage system such as system 100 by reducing the processing, storage and memory required for data storage and retrieval. The invention affords on-demand partial decompression of selected portions or fractions of compressed data pages that contain the desired data of interest, and is resumable so that additional desired data may be decompressed at a different time without repeating decompression of previously decompressed data. This reduces processing and affords more efficient use of resources. In addition to selective partial decompression, the invention affords in-place decompression where the same input page holding compressed data from storage is used also as an output page or buffer for uncompressed data as the compressed data on the page is decompressed. This results in better cache utilization and reduces memory usage for data decompression. Moreover, since in-place decompression is resumable, it may be continued from a position where decompression previously stopped (or from a different position) rather than restarting from the beginning offset, it avoids unnecessarily decompressing previously decompressed data to retrieve the data of interest.

FIGS. 2A and 2B illustrate an on demand in-place resumable partial decompression process in accordance with an embodiment of the invention to retrieve and decompress selected data, such as a particular file, from compressed disk storage 120. Using the metadata stored in memory 128, information about the desired data may be determined, such as its length in bytes, the location in disk storage of a page of compressed data corresponding to the desired data, and the offset within the page to the beginning of the desired compressed data. The system may then allocate a new input page 200 in memory 128 which the system uses as a buffer for both input and output. As indicated above, the page 200 may be 128 KB in length. In accordance with the invention, this single new page 200 will be used as both an input buffer for compressed data and as an output buffer for decompressed data.

As shown in FIG. 2A, selected compressed data 210 corresponding to the desired data may be read from disk storage and written onto page 200 with the end of the compressed data aligned with one end 212 of the page. A small sliding header 214 may be written onto the page at the beginning of the compressed data, and a movable pointer (comp_end_pp) 216 may be created and stored in memory 128 that points to the starting location of the compressed data on the page 200. The remaining portion 218 of page 200 initially may be empty except for a small field 220 at the beginning of the page that may be used as a state descriptor, as will be described. Additionally, a second movable pointer (decomp_end_pp) 224 that indicates the ending location of decompressed data on the page may be created and stored in memory. Initially, before any data is decompressed, pointer 224 may point to the beginning of the page. Thereafter, the pointer may move (to the right in the figure) as decompressed data is written to the free area 218 of the page.

Assuming that the entirety of the region 210 of compressed data is to be decompressed, after the compressed data is written to page 200, it may be read at 230 from the page beginning at the start position of the compressed data on the page at the pointer 216 location. As the data is read, it may be decompressed at 232 by decompressor 124, and the decompressed data may be written back to page 200, as indicated at 234, beginning from end 226 of the page. If only a portion of the compressed data is needed and the entire region of compressed data not to be decompressed. The system may use the metadata to indicate the offset within the region of compressed data where the desire data is located, and decompression may begin at that point. As stated, the decompressed data may be written to the unwritten area 218 of the page, initially starting at the beginning 226 of the page as indicated by the location of pointer 224. As the compressed data 210 is read and decompressed, the decompressed data is written successively into the free area 218 of page 200 from the beginning 226 of the page and moving towards the ending page location of the compressed data. As the decompressed data is written onto the page, the pointer 224 moves (from left to right in the figure) to track the ending location on the page of the decompressed data, and the pointer 216 moves in the same direction to track the beginning of the remaining compressed data to be decompressed. This is illustrated in FIG. 2B where the decompressed data 240 is shown occupying substantially the whole of the originally free area 218 of the page. Pointer 224 has moved to track the ending location of the decompressed data, and pointer 216 has moved to track the end location of the still compressed data 210 that has yet to be decompressed. The offset locations of the pointers 216 and 224 on the page may be maintained in the state descriptor field 220 to facilitate resumption of decompression after a stop, as described below.

FIG. 2B illustrates the usual case where after one decompression call the decompressed data written to the free area of the page has not caught up to the end of the compressed data still on the page, i.e., where decomp_end_pp<comp_end_pp, and remaining space is available on the page. A case where the decompressed data written to the page catches up to the compressed data which has not been decompressed will be described below in connection with FIG. 3.

Where only part of the compressed data 210 is desired, decompression may be stopped and resumed on demand at a different location. To facilitate this, the system may keep track of one or more internal states, such as the input offset with respect to the compressed data of the data that is being decompressed, the output offset corresponding to the ending position of uncompressed data, and the remaining compressed data size. The state field 220 of the page 200 may be used for this purpose by storing a structure that is used as a descriptor of the uncompressed region. This enables the decompressor to reenter a region and resume decompression incrementally, which is advantageous in affording on-demand decompression.

As an example of on-demand decompression, assume a compressed region of sixteen data chunks (segments) is loaded into memory and written onto a memory page. Later when a first read request to this region comes in and requests the content of the first, second and third chunks, the system may use metadata describing internal states to identify and decompress a length of compressed bytes that corresponds to the sum of these three chunks. At a time later, another read request to the same region may request the content of chunks 3, 4, 5, 6 and 7. The system may reenter the region using the internal state metadata and resume decompression on chunks 4, 5, 6 and 7 to satisfy this current read request. If there are no further requests for the other chunks in this region, the remaining eight chunks would never be decompressed, thereby avoiding the associated processing and memory overhead.

In a preferred form, the decompressor 124 may be a software API that controls processor 110 to perform decompression, or may be an appliance having its own internal processor. A preferred decompression API is:

```
dd_int32_t ddlz_decompress_block_partial(dd_pag_ptr_t *comp_end_pp,
    dd_uint32_t *comp_bytes,
        dd_uint32_t bytes_to_decomp,
    dd_page_ptr_t *decomp_end_pp)
@comp_end_pp (i/o) the position at which data starts being uncompressed
@comp_bytes (i/o) compressed data size; will be updated on return
@bytes_to_decomp (i) the number of bytes to decompress in this call
    @decomp_end_pp (i/o) the ending pos of the uncompressed data
```

The invention is independent on the particular type of compression used. As may be appreciated, the decompressor may use a similar API to perform compression of incoming data for storage in storage 120. In an embodiment, compression may be a form of LZ (Lempel-Ziv) compression, for example.

Figure 3:
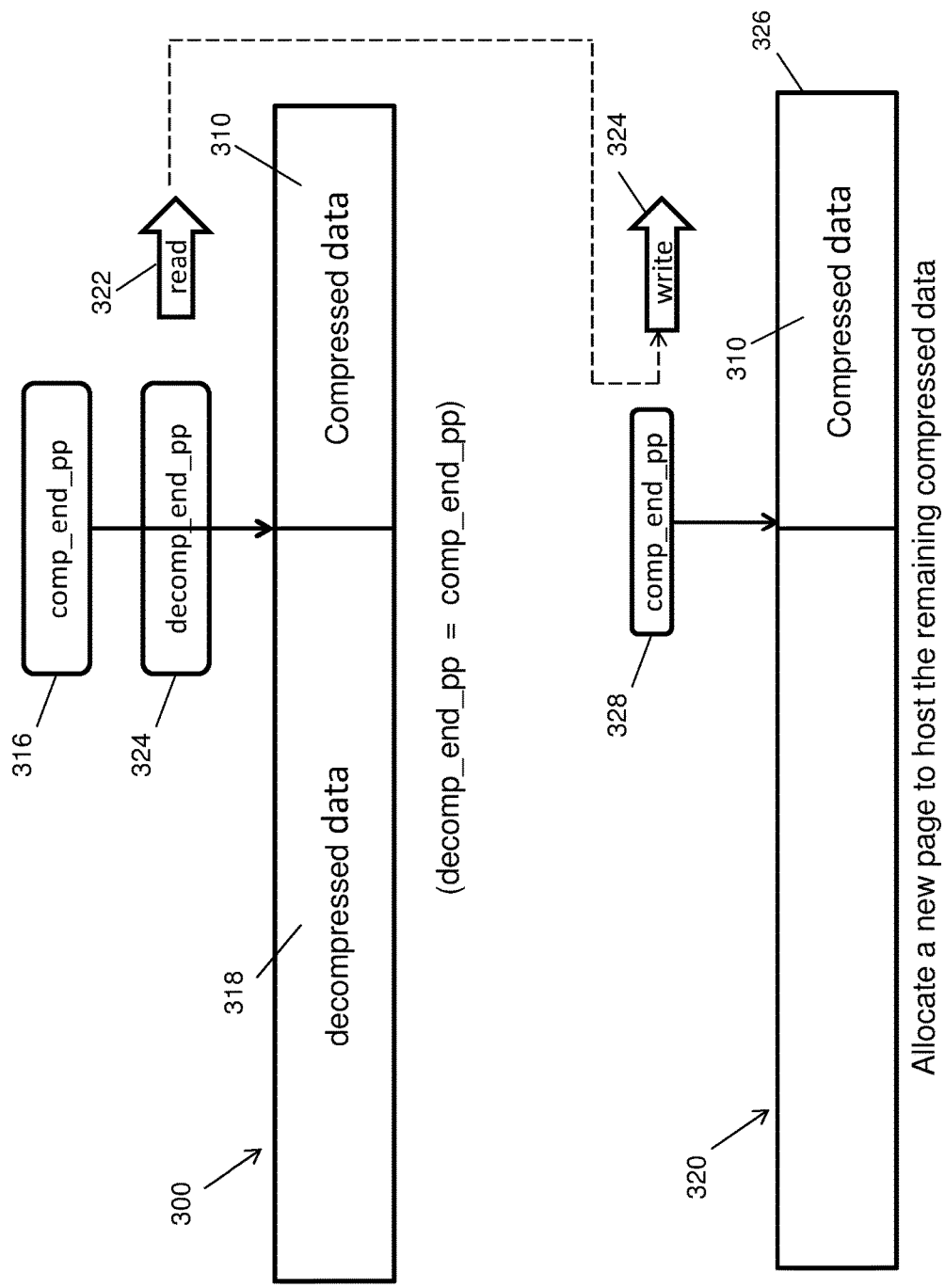
FIG. 3 is a diagrammatic view illustrating in-place resumable partial decompression using a single page in accordance with the invention where the decompressed data catches up to the compressed data.

FIG. 3 illustrates an infrequently occurring case referred to as a corner case where the output decompression catches up with the input offset of compressed data on a page. In this rare instance, single page decompression does not work, and the process may be modified to accommodate this situation. Referring to FIG. 3, compressed data 310 may be read and decompressed, as described above in connection with FIGS. 2A-2B, to produce decompressed data 318 which is written onto a page 300. As indicated in the figure, the decompressed data 318 has a length on the page such that the end position of the decompression data as indicated by the pointer 324 (decomp_end_pp) catches up to the page location of the compressed data 310, as indicated by pointer 316 (comp_end_pp), and is about to overlap the compressed data. At this point decomp_end_pp=comp_end_pp, and further decompression will begin to overwrite and corrupt the compressed data. To prevent this, the system may monitor the positions of the two pointers 316 and 324. Upon detecting the potential overlap, the system may suspend further decompression, allocate a new page at 320 in memory, read the compressed data 310 at 322 from the original page 300 and write at 324 the compressed data 310 aligned to the end 326 of the new page 320. The system may then remove pointer 316 from page 300 and write a new pointer 328 (comp_end_pp) to the new page 320 to indicate the beginning location on the new page of the rewritten compressed data. The system may then continue decompressing the rewritten compressed data 310 from new page 320 and writing the decompressed data to original page 300 (in a similar manner to that described above in connection with FIGS. 2A-2B), overwriting the previously written compressed data 310 on the original page 300.

It should be noted that the in-place decompression approach described herein applies not only to a single memory page, it also applies to a list of a plurality of memory pages. In this instance, the compressed data may be aligned to the end of the last page of the page list, similarly to that described above for FIG. 2A. Decompression may begin with input from a beginning offset of the start of compressed data on that last page in the page list, and decompressed output may be written to a beginning offset of the first page in that page list. This is illustrated in FIG. 4.

Figure 4:
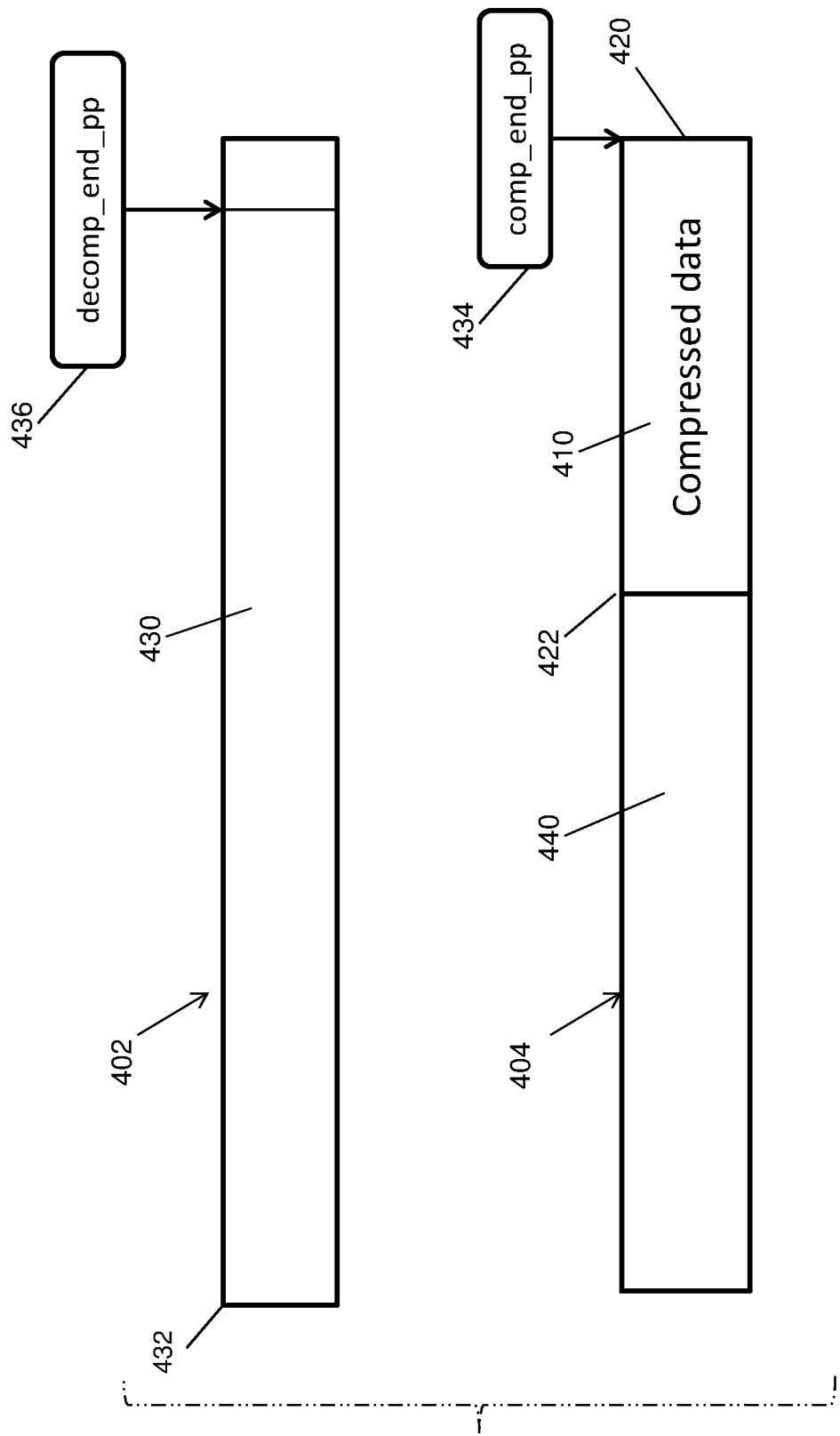
FIG. 4 is a diagrammatic view illustrating the invention in connection with a page list comprising a plurality of pages.

Referring to FIG. 4, two pages 402 and 404 may be allocated as a page list. Compressed data 410 may be written to the second (last) page 404 aligned to end 420 of the page. Decompression of the compressed data 410 may commence with the compressed data starting at offset 422 of the last page 404 and the decompressed data 430 may be written to the first page 402 aligned to end 432 of the page, as shown. Upon decompression of all of compressed data 410, pointer 434 (comp_end_pp) will point to the end 420 of page 404, and a pointer 436 (decomp_end_pp) may point to the ending location of the decompressed data 430 on page 402. In the event that only a portion of compressed data 410 is decompressed and the decompressed portion substantially fills the entire page 402 with the compressed data 430, as shown, either an additional page may be allocated from memory for the remaining decompressed data, or the remaining decompressed data may be written onto the free region 440 of the last page 404 in a manner similar to that described above in connection with FIGS. 2A-2B.

The in-place selective partial decompression capabilities afforded by the invention are particularly advantageous for garbage collection in systems that process and store data the changes frequently, as well as in data backup systems. Garbage collection processes have to move and reorder data because dead chunks of data may be interspersed among life chunks of data. Since the data chunks have typically been compressed and packed into compression regions in order to reduce the storage footprint, is necessary to first decompress the chunks and copy the live chunks to a new location, in order to reclaim the previous storage locations for new data. Since the invention enables decompression of a portion or a fraction of a region of data, it permits decompression of only the fraction of compressed data that contains the live chunks. For instance, if in a compressed region of sixteen chunks, the second, the third and the sixth chunks are live while the rest of the sixteen chunks are dead, the invention permits selective decompression of the compressed region corresponding to the first six chunks of data. It may start decompression starting from the first of chunk of the region and continuing to the end of the offset of the sixth chunk, the last live chunk of the region. It may do this using the metadata providing information as to chunk size, information indicating which chunks have changed, and the beginning offset of these compression region. Furthermore, the metadata may be constructed to indicate the starting offset of the first live chunk within a compressed region of data. In this event, decompression could begin starting with the second chunk, the first live one in the region, thereby reducing processing, saving memory resources, and improving system data throughput. The decompressed live chunks of data may be compressed and written back to primary storage, and the original storage space corresponding to the dead chunks may be reclaimed.

In addition to conserving processing resources and minimizing memory usage, the invention affords other advantages. Storage systems of enterprises and other organizations frequently have to handle a large number of concurrent read requests. It is highly advantageous in accordance with the invention to have the ability to perform decompression using a single page for both input and output in order to optimize read performance for multiple concurrent streams. During data reads, each read stream may load regions asynchronously ahead of read requests, and cache the regions in pages of a fixed size allocated from a memory page pool. The streams all compete with each other for cache space. The high the number of streams, the more intense is the competition. When the cache is under pressure, it evicts previously cashed regions to accommodate newly loaded ones. If a loaded region is evicted before receiving a read request, the overhead consumed in loading that region is wasted, and it is necessary to reload the region in order to meet the read request.

The invention's in-place partial decompression that uses one page for both input and output reduces the storage footprint by one half, and reduces the contention for memory pages. Effectively, it increases the cache space per stream with no overhead. Experimental results indicate that with the invention a large number, of the order of 68%, for instance, of the regions loaded to cache use only a single page for decompression. This substantially minimizes cache trashing and improves the data locality for low-generation or high-generation read streams because each stream may have more regions cached, thereby increasing the likelihood of cache hits.

From the foregoing, it may be seen that the invention affords significant advantages for data storage systems, particularly for enterprise storage systems that process multiple streams in parallel, by optimizing processing, memory and storage resources by storing data in compressed format and by providing for on-demand in-place partial decompression of selected compressed data using a single memory page for both input and output. The invention affords significant improvements in garbage collection efficiency, and for enterprise storage systems that process multiple streams in parallel, the invention affords substantially improved cache utilization and data throughput.

While the foregoing has been with reference to preferred embodiments of the invention, it will be appreciated that changes to these embodiments may be made without departing from the principles and the spirit of the invention, the scope of which is defined by the appended claims.

The invention claimed is:

1. A method of retrieving desired data from primary storage in a data storage system that stores as compressed data, the system including a processor and memory having a pool of pages of a predetermined length in bytes, the method comprising:
    allocating an empty page of memory from said pool, said empty page being free of data and having a beginning and an end;
    reading from said primary storage selected compressed data that contains said desired data and writing said read selected compressed data onto said empty page with the selected compressed data being written aligned with said end of said empty page;
    selecting a start position in said selected compressed data written to said page that corresponds to a start of said desired data;
    decompressing in place said compressed data written to said page beginning at said selected start position of said desired data to form decompressed data;
    creating a first pointer pointing to a first location on said page corresponding to said start position of said selected compressed data and creating a second pointer at a second location on said page corresponding to an end of said decompressed data written to said page;
    writing simultaneously said decompressed data as it is decompressed onto said page such that said decompressed data is written aligned with said beginning of said page, wherein said page contains during said writing both compressed and decompressed data;
    moving said first and second pointers to track changes in said first and second locations as said selected compressed data on said page is decompressed and as said decompressed data is written to said page; and
    upon said second location corresponding to said end of said decompressed data written to said page moving to a position corresponding to the first location of the compressed data on said page, allocating a second page, copying said compressed data from said page to which it was written to said second page, and continuing decompressing using the copy of said compressed data on said second page and writing the decompressed data to said page overwriting said compressed data on said page, thereby preserving the a copy of the compressed data first written to said page.

2. The method of claim 1, wherein said page serves as both an input buffer for said selected compressed data and as an output buffer for said decompressed data.

3. The method of claim 1, wherein said selecting said start position comprises accessing stored metadata that provides information about offsets of starting locations of in said compressed data of said desired data.

4. The method of claim 1 further comprising stopping decompression of said selected compressed data at a desired stop location within said selected compressed data on said page, and resuming decompression of said selected compressed data at said stop location or at another different location on said page corresponding to other desired data.

5. The method of claim 4 further comprising maintaining state information indicating said stop location in a state field on said page to facilitate resumption of decompression.

6. A method of retrieving desired data from primary storage in a data storage system that stores data as compressed data, said desired data comprising valid live data interspersed among non-desired invalid dead data, the system including a processor and memory having a pool of pages of a predetermined length in bytes, the method comprising:
    allocating an empty page of memory from said pool, said empty page being free of data and having a beginning and an end;
    reading from said primary storage compressed data and writing said read compressed data onto said empty page with the compressed data being written aligned with said end of said empty page, said compressed data having a start position on said page and comprising said chunks of desired live data;
    selectively decompressing in place only a portion of said compressed data written to said page, said decompressed portion corresponding to said chunks of desired live data and comprising decompressed live data;
    creating a first pointer pointing to a first location on said page corresponding to said start position of said selected compressed data and creating a second pointer at a second location on said page corresponding to an end of said decompressed data written to said page;
    writing simultaneously said decompressed live data as it is decompressed onto said page such that said decompressed live data is written aligned with said beginning of said page, wherein said page contains both compressed and decompressed data;
    moving said first and second pointers to track changes in said first and second locations as said selected compressed data written to said page is decompressed and as said decompressed live data is written to said page; and
    upon said second location corresponding to said end of said decompressed live data written to said page moving to a position corresponding to the first location of the compressed data written to said page, allocating a second page, copying said compressed data from said page to which it was written to said second page, continuing decompressing using the copy of said compressed data on said second page, and writing the decompressed data to said page overwriting said compressed data on said page, thereby preserving the a copy of the compressed data first written to said page.

7. Non-transitory computer readable media for storing executable instructions for controlling a processor to perform a method of retrieving desired data from primary storage in a data storage system that stores data as compressed data, the system including a processor and memory having a pool of pages of a predetermined length in bytes, the method comprising:

allocating an empty page of memory from said pool, said empty page being free of data and having a beginning and an end;

reading from said primary storage selected compressed data that contains said desired data and writing said read selected compressed data onto said empty page with the selected compressed data being written aligned with said end of said empty page;

selecting a start position in said selected compressed data written to said page that corresponds to a start of said desired data;

decompressing in place said selected compressed data on said page beginning at said selected start position of said desired data to form decompressed data;

creating a first pointer pointing to a first location on said page corresponding to said start position of said selected compressed data and creating a second pointer at a second location on said page corresponding to an end of said decompressed data written to said page;

writing simultaneously said decompressed data as it is decompressed onto said page such that said decompressed data is written aligned with said beginning of said page, wherein said page contains during said writing both compressed and decompressed data;

moving said first and second pointers to track changes in said first and second locations as said selected compressed data written to said page is decompressed and as said decompressed live data is written to said page; and upon said second location corresponding to said end of said decompressed live data written to said page moving to a position corresponding to the first location of the compressed data written to said page, allocating a second page, copying said compressed data from said page to which it was written to said second page, continuing decompressing using the copy of said compressed data on said second page, and writing the decompressed data to said page overwriting said compressed data on said page, thereby preserving the a copy of the compressed data first written to said page.

8. The non-transitory computer readable media of claim 7, wherein said page serves as both an input buffer for said selected compressed data and as an output buffer for said decompressed data.

9. The non-transitory computer readable media of claim 7, wherein said selecting said start position comprises accessing stored metadata that provides information about offsets of starting locations of data in said region, and using said metadata to identify said start of said desired data.

10. The non-transitory computer readable media of claim 7 further comprising stopping decompression of said selected compressed data at a desired stop location within said selected compressed data on said page, and resuming decompression of said selected compressed data at said stop location or at another different location on said page corresponding to other desired data.

11. The non-transitory computer readable media of claim 10 further comprising maintaining state information indicating said stop location in a state field on said page to facilitate resumption of decompression.

12. The non-transitory computer readable media of claim 7, wherein said desired data comprises valid live data chunks interspersed among invalid dead data chunks, and wherein said decompressing comprises selectively decompressing only compressed data corresponding to said live data chunks.

* * * * *